REMOTE CONTROL SYSTEM FOR A TELEVISION RECEIVER

Filed March 18, 1957

INVENTORS.
JOSEPH G. ANDRE BOURGET.
CHRISTIAN CARL PFITZER.
BY Alden D. Redfield
Irwin P. Garfinkle
ATTORNEYS.

2,930,955

REMOTE CONTROL SYSTEM FOR A TELEVISION RECEIVER

Joseph G. Andre Bourget, Chicago, Ill., and Christian Carl Pfitzer, Cincinnati, Ohio, assignors to Avco Manufacturing Corporation, Cincinnati, Ohio, a corporation of Delaware Application March 18, 1957, Serial No. 646,624
6 Claims. (Cl. 318—16)

Figures 1, 2:
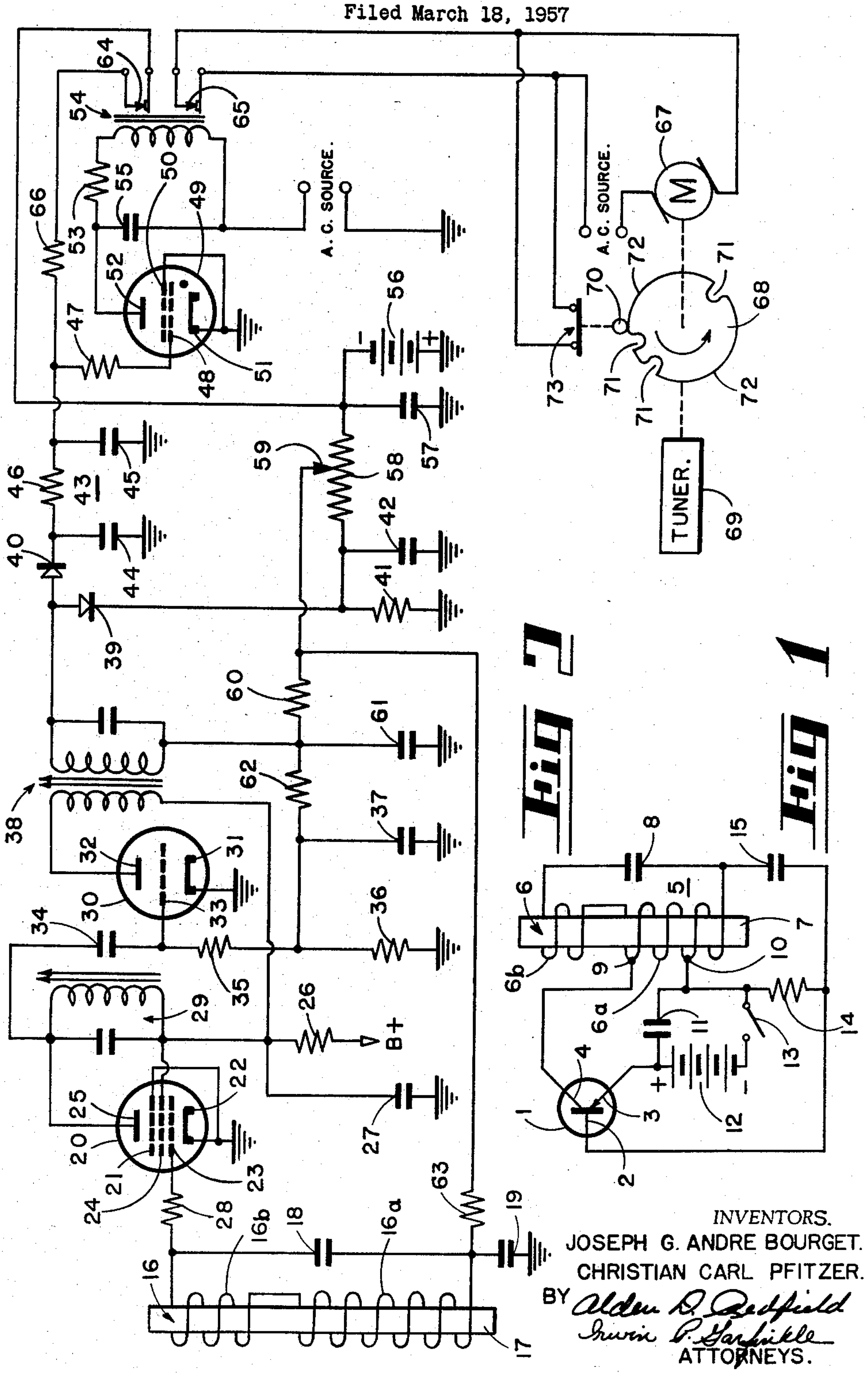

This invention relates generally to a remote control system for a television receiver and, more particularly, to a wireless remote control system employing magnetic energy for controlling the operation of a television tuner.

In most home television receivers, a turret-type, manually-operable tuner is mounted on the receiver chassis and, when it is desired to change channels, it is necessary that the adjustment be made at the receiver. A primary object of this invention is to provide a wireless control device which will permit reliable operation of the tuner of a television receiver at a control station remote from the receiver.

A further object of this invention is to operate an automatic, motor-driven tuner by means of a wireless remote control device which comprises a transmitter for generating magnetic waves and a receiver for receiving said waves for controlling the operation of said motor-driven tuner.

An example of the type of motor-driven tuner apparatus with which this invention finds utility is fully disclosed by Walter E. Foster in his application for U.S. Patent, Serial No. 610,162, for "Automatic Tuner for Television Receiver," filed September 17, 1956, now United States Patent 2,812,486, and assigned to the same assignee as this invention. The Foster device provides a tuner which is driven selectively by an electric motor either step by step through each of the consecutive tuner positions, or to certain preselected positions. The controls for the Foster type of automatic tuner are mounted at the television receiver, and operation of the tuner is controlled only at the receiver or at a remote station connected to the receiver by wires. It is an object of the present invention to provide a simple and reliable wireless remote control for such automatic tuners.

For a more comprehensive understanding of the nature and objects of this invention, reference should now be made to the following description and to the accompanying drawing, in which:

Fig. 1 is a schematic representation of the remote transmitter used in accordance with this invention; and Fig. 2 is a schematic representation of the receiver used in accordance with this invention.

Early investigations to produce short range control systems for television receivers suggested a number of transmission mediums. Among those considered were light beams, ultrasonic waves, electrostatic radio waves and magnetic fields. Since apparatus for generating magnetic fields is readily available and inexpensive, and since difficulty due to extraneous sources and stability readily can be overcome, generation by this medium appears to present the best method of wireless remote control for television receivers. However, care must be taken that the magnetic fields generated by the receiver's deflection circuits do not interfere with the operation of the device. In commercially available home receivers it has been found that an operating frequency in the audio frequency range between 4,500 to 6,000 cycles is satisfactory and, in addition, is below the radiation frequencies regulated by the Federal Communications Commission.

The transmitter portion of the remote control system is illustrated in Fig. 1. For the purpose of transmitting a magnetic field in the audio frequency range, a Hartley type oscillator with a transistor as the active element is employed in conjunction with an inductance coil wound on a ferrite core. The transmitter employs a PNP type transistor 1 comprising a base 2, an emitter 3 and a collector 4 and is connected for common emitter operation, i.e., the emitter 3 is common to the input circuit between the base 2 and the emitter 3 and to the output circuit between the emitter 3 and the collector 4. It is to be understood, however, that either PNP or NPN type transistors, connected common emitter, common base or common collectors may also be used by means of such appropriate alterations in the circuitry as are well known in the art.

A resonant network 5 for producing magnetic fields to be transmitted is connected in the oscillatory circuit of the transistor 1 and includes an antenna 6 comprising two series-connected coils *6a* and *6b* wound on a ferrite core 7. A fixed condenser 8 tunes the antenna to the desired frequency within predetermined tolerances, and for providing fine tuning the coil *6b* is friction-mounted on the core 7 and is movable relative to the coil *6a*. By moving the coil *6b* towards or away from the coil *6a*, the mutual inductance between the coils may be varied and, hence the resonant frequency of the network 5 may be adjusted within close limits. The collector 4 is shown connected to the antenna 6 at a tap 9 to provide an impedance match between the resonant system and the transistor 1 and to provide stability. Depending on the particular impedances found in the system, this connection may be made at any convenient tap on either of the coils *6a* or *6b*. The emitter 3 is coupled to coil *6a* at a tap 10 through a condenser 11. A battery 12, in series with a momentary switch 13, is connected across the condenser 11 and in series with a biasing resistor 14 and the base 2. A positive feedback circuit from the resonant network 5 to the base 2 is provided by the condenser 15 for the purpose of sustaining oscillations.

To start oscillations, the momentary switch 13 is depressed and the battery 12 is connected in circuit with the base 2 through the biasing resistor 14 and in circuit with the collector 4 through the coil 6. The oscillations continue until the circuit is broken at the switch and, in practice, operation for only an instant is required. For the maximum radiated magnetic field with the available transmitter power, coil 6 and core 7 are chosen for a large length-to-diameter ratio consistent with a high Q resonant circuit 5.

The magnetic fields transmitted from the antenna coil 6 are received at a local control device located at the television receiver chassis and illustrated in Fig. 2, to which reference should now be made. In the preferred form of the invention the received signals are amplified through two stages and then limited, detected, and integrated. The integrated signals are used to control a gas thyratron, the firing of which energizes a relay to operate the driving motor for the tuner.

The receiver comprises an antenna 16 wound on a ferrite core 17, and for the purpose of receiving the transmitted magnetic field, the antenna is tuned by means of a condenser 18 to the transmitter audio frequency. Since there is maximum coupling of the generated magnetic fields when the axes of the receiving and transmitting antennas are parallel, antennas 6 and 16 are mounted in vertical positions. In this way, the axes of both coils will be parallel at all times, irrespective of the location of the transmitter with respect to the receiver. As in the receiver, the antenna 16 may be comprised of two series-connected coils 16*a* and 16*b*, the coil 16*b* being friction-mounted on the core 17 and movable on the core relative to the coil 16*a* to vary the mutual inductance and thus provide fine tuning. The A.C. circuit of the antenna 16 is connected to ground through a D.C. blocking condenser 19.

The first stage of amplification for the signals received at the antenna 16 comprises a pentode 20 having a suppressor grid 21 connected in the usual manner to the cathode 22 which is grounded, a control grid 23, a screen grid 24, and a plate 25. The screen grid 24 and plate 25 are powered from a B+ supply through a resistor 26 which is by-passed for A.C. by a condenser 27. The received signals are coupled for amplification from the antenna 16 to the control grid 23 through a grid resistor 28. A resonant network 29 tuned to the audio frequency of the magnetic field received at the coil 16 constitutes the A.C. load of the pentode and is connected in the plate circuit.

The second stage of amplification comprises a triode 30 having a grounded cathode 31, a plate 32 and a control grid 33. The control grid 33 is capacitively coupled to the plate 25 and the resonant load 28 of pentode 20 through a coupling condenser 34. The grid is connected to ground through a grid leak resistor 35 and a resistor 36 which is A.C. by-passed by a condenser 37. The plate 32 is connected to the B+ supply through the resistor 26 and the primary winding of a transformer 38 which comprises the A.C. load of the triode.

The output from the triode 30 is taken from across the tuned secondary winding of transformer 38 and applied to the two diode rectifiers 39 and 40. The diode 39 acts as a limiter and is connected to ground through a resistor 41, which is A.C. by-passed by a condenser 42. The diode 40 is a peak detector, and its output is applied to an integrating network 43 comprising the condensers 44 and 45 and the resistor 46 which, in turn, is coupled through resistor 47 to the control grid 48 of a gas thyratron 49. The screen grid 51 of the thyratron is connected to the grounded cathode 50, while the plate 52 is connected in circuit with an alternating current source through a plate resistor 53 and a circuit operating relay 54. A large condenser 55 is connected across the relay winding 54 and the resistor 53 for the purpose of preventing chattering in the operation of the relay. A source of negative D.C. potential is available at a battery 56 which is by-passed for A.C. by a condenser 57 and is connected across resistors 58 and 41. Bias for the diode 39 is taken from the resistor 41 and, thus, the diode limits signals at the detector 40 to a predetermined peak. A control voltage for the thyratron is taken from the resistor 58 at a moveable tap 59, which may be adjusted for the purpose of varying the bias applied to the grid 48 through resistor 60, the transformer 38 and the integrating network 43. Thus, the sensitivity of the thyratron to a given transmitted signal is controlled and the amplitude of a signal necessary to fire the thyratron 49 may be adjusted.

It may be seen that in the system described to this point, a signal received at the coil 16 is amplified first in the pentode 20 and then in the triode 30. The amplified signal is applied to the grid 48 of the thyratron 49 to cause the thyratron to conduct and energize the relay 54. However, the signal is first limited in the diode 39, detected or rectified in the diode 40, and then integrated in the network 43. The condensers 44 and 45 employed in the network 43 are very large and, thus, charging and discharging takes place very slowly. For this reason, biasing of the thyratron due to fast, short pulses from such magnetic sources as telephones, ignition systems, etc., is prevented, and the network 43, in conjunction with the limiter 39, eliminates almost all possibility of unwanted thryratron firings due to noise bursts and other extraneous causes.

In accordance with this invention, a source of automatic gain control is available at the resistor 60 which is A.C. by-passed by condenser 61. The AGC voltage is applied to the grid 33 of triode 30 through a resistor 62 and the grid leak resistor 35. In addition, a source of automatic gain control is available at the tap 59 and is fed back through the resistor 63 and the coil 16 to the grid 23 of pentode 20. These automatic gain control features prevent overloading of the receiver when the transmitter is operated at close range, and thus permits movement of the transmitter to any position in the room where the television receiver is being operated.

When the thyratron 49 is fired by an appropriate signal, the relay 54 is energized thereby closing relay contacts 64 and 65. Immediately upon the closing of the contact 64, a resistor 66 is connected in circuit with the integrating network 43 and with the grid 48 of the thyratron. Simultaneously, the contacts 65 close to energize the motor 67 to rotate the cam 68 and the tuner 69. After the cam 68 has rotated an amount sufficient to raise the cam follower 70 out of a depressed cam portion 71 and on to an elevated cam portion 72, the contacts 73 will be closed. Since the thyratron 49 is supplied with alternating current, it conducts for only a very short interval after the grid 48 is pulsed and, therefore, the relay 54 is energized only momentarily. When the thyratron stops conducting, the contact 64 opens to disconnect the resistor 66; however, although the contact 65 opens, motor 67 is still energized from the A.C. source through the closed contacts 73 until the cam follower reaches a depressed cam portion 71. By arranging the depressions of the cam in accordance with pre-selected channels on the television tuner, the tuner 69 will be rotated automatically and consecutively to the pre-selected stations with each firing of the thyratron.

As was previously noted, the condensers 44 and 45 were made large for preventing the firing due to noise or other extraneous sources. However, once the thyratron has been biased sufficiently to cause it to fire as a result of a signal which has charged the condenser 45, the condenser 45 can discharge only through the resistor 47 and the path from the grid 48 to the cathode 51 and, therefore, the rate of discharge may be so slow that enough bias voltage will remain on the grid to again fire the thyratron after the selected position is reached. By momentarily connecting the resistor 66 in circuit with the condenser 45 and the negative supply at the battery 56, the condenser 45 is discharged quickly, and the bias on grid 48 is reduced to prevent re-firing of the thyratron.

While the cam follower arrangement shown is satisfactory, it will be understood that our invention finds greatest utility when used in conjunction with that type of tuner arrangement disclosed in the aforementioned Foster application, Serial No. 610,162, now United States Patent 2,812,486. In the Foster apparatus the tuner may be automatically driven either step by step to each one of the channels of the television receiver, or to any one of certain preselected channels of the receiver.

It is seen, therefore, that by means of this invention there has been provided a wireless remote control system which will be reliable and inexpensive. In addition, the system will not be affected materially by extraneous energy sources and, due to the fact that it operates in the audio frequency range, it does not come under the regulation of the Federal Communications Commission. Moreover, the use of automatic gain control in the audio frequency system permits use of the transmitter at any distance from the receiver within the power limitations of the transmitter.

What is claimed as our invention is:

1. A control system for operating an electric motor-driven tuner of a television set from a position remote from said set comprising: means including a transmitting antenna coil wound on a first ferrite core for transmitting pulses of magnetic energy in the audio frequency range from said remote position; means including a receiving antenna coil wound on a second ferrite core at said television set for receiving said pulses of magnetic energy, the longitudinal axis of said first ferrite core being disposed parallel to the longitudinal axis of said second ferrite core; an electric valve responsive to said received magnetic energy for energizing said electric motor to drive said tuner; and means for de-energizing said motor when said tuner reaches a predetermined position; and means for preventing re-energization of said motor except on receipt of additional pulses of magnetic energy.

2. A system for controlling the energization of an electric circuit comprising: means for receiving magnetic waves in the audio frequency range and for amplifying said magnetic waves; means for rectifying said amplified waves and for coupling said rectified waves to a gas-filled tube having a grid, a cathode and a plate, said coupling means comprising an integrating network including a resistor connected in series with said grid and a condenser connected in parallel with said grid, the bias on said grid being controlled by the charge on said condenser; a relay winding connected in series with said plate, said cathode and a source of alternating current; first and second switches operatively associated with said relay winding; means associated with said first switch for discharging said condenser after the firing of said gas-filled tube; and means associated with said second switch for controlling the energization of said electric circuit.

3. The invention as defined in claim 2 wherein said means associated with said first switch comprises a resistor which is connected across said condenser when said first switch is operated by said relay winding.

4. A remote control system for controlling the operation of a television tuner which is driven by an electric motor comprising: a generator for generating a magnetic field in an audio frequency range, said generator including a transmitting antenna coil wound on a ferrite core and tuned to said audio frequency, and means for setting up oscillation in said transmitting antenna; a receiver for receiving said magnetic field for controlling an electronic switch to control the operation of said motor, said receiver including a receiving antenna coil wound on a ferrite core and tuned to said audio frequency, the longitudinal axes of each of said ferrite cores being positioned vertically; means for rectifying signals received at said receiving antenna coil; said electronic switch comprising a thyratron having a plate, a cathode and a grid; a resistance-capacitance network for coupling said rectified signals to said grid, said network having a relatively long time constant for charging and discharging; a relay having first and second normally open switches, said first switch being connected in circuit with said network for rapidly discharging said network when said relay is energized and said first switch is closed, said second normally open switch being connected in circuit with said motor; and an alternating current source connected in circuit with said cathode, said plate and said relay.

5. In a system for controlling the energization of the operating circuit of a rotatable tuner of a television set from a position remote from said set, the combination comprising: a transmitter at said remote position for transmitting pulses of magnetic energy in an audio frequency range, said transmitter including an antenna coil wound on a ferrite core; a receiver for receiving said magnetic energy, said receiver including an antenna coil wound on a second ferrite core, the longitudinal axes of said first and second ferrite cores being vertically positioned; a thyratron having a plate, a cathode and a grid; a network for coupling said received magnetic energy to the grid of said thyratron, said network including a resistance-capacitance circuit having a relatively long time constant for charging and discharging; a relay operatively associated with first and second normally open switches, said first switch being connected in circuit with said coupling network for discharging said network at a rapid rate when said first switch is closed; an alternating current source connected in circuit with said cathode, said plate and said relay, the operating circuit of said tuner being connected in series with said second switch.

6. In apparatus for controlling the energization of an electric circuit, the combination comprising: a thyratron having at least a plate, a cathode and a grid; an input circuit for said thyratron including a resistance-capacitance network connected between said cathode and said grid, said network having a relatively long time constant for charging and discharging; a circuit for rapidly discharging said network connected to said network through a first normally open switch; an alternating current source; a relay including a winding, said first normally open switch and a second normally open switch, said first and second normally open switches operatively associated with said winding; said electric circuit being de-energized when said second switch is open and being energized when said second switch is closed; said alternating current source and said winding being connected in a closed series loop with the cathode and plate of said thyratron whereby said thyratron is rendered conductive during the positive cycle of said alternating current source when the voltage on said input circuit exceeds a predetermined amount, thereby energizing said relay winding and closing said first and second contacts during said positive cycle to energize said electric circuit and simultaneously discharge said network and prevent re-conduction of said thyratron.

References Cited in the file of this patent

UNITED STATES PATENTS

| | | |
|---|---|---|
| 1,320,142 | Hanson | Oct. 28, 1919 |
| 1,387,513 | Rabb | Aug. 16, 1921 |
| 1,930,029 | Alden | Oct. 10, 1933 |
| 2,213,301 | Brown | Sept. 3, 1940 |
| 2,294,208 | Roberts | Aug. 25, 1942 |
| 2,474,527 | Heisner | June 28, 1949 |
| 2,542,189 | Gates et al. | Feb. 20, 1951 |